(12) United States Patent
Oh et al.

(10) Patent No.: US 11,182,623 B2
(45) Date of Patent: Nov. 23, 2021

(54) FLEXIBLE HARDWARE DESIGN FOR CAMERA CALIBRATION AND IMAGE PRE-PROCESING IN AUTONOMOUS DRIVING VEHICLES

(71) Applicant: Baidu USA LLC, Sunnyvale, CA (US)

(72) Inventors: Kwan Oh, Sunnyvale, CA (US); Manjiang Zhang, Sunnyvale, CA (US); Min Guo, Sunnyvale, CA (US); Tiffany Zhang, Sunnyvale, CA (US); Chang Shu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 98 days.

(21) Appl. No.: 16/399,457

(22) Filed: Apr. 30, 2019

(65) Prior Publication Data

US 2020/0349361 A1   Nov. 5, 2020

(51) Int. Cl.
*G06K 9/00* (2006.01)
*G05D 1/02* (2020.01)
*G06K 9/54* (2006.01)
*G05D 1/00* (2006.01)

(52) U.S. Cl.
CPC ....... *G06K 9/00791* (2013.01); *G05D 1/0088* (2013.01); *G05D 1/0212* (2013.01); *G05D 1/0251* (2013.01); *G06K 9/54* (2013.01); *G05D 2201/0213* (2013.01)

(58) Field of Classification Search
CPC .... G06K 9/00791; G06K 9/54; G05D 1/0212; G05D 1/0088; G05D 1/0251; G05D 2201/0213
See application file for complete search history.

(56) References Cited

U.S. PATENT DOCUMENTS

| | | | |
|---|---|---|---|
| 9,632,502 B1* | 4/2017 | Levinson | G01S 17/87 |
| 2019/0056484 A1* | 2/2019 | Bradley | G01S 17/42 |
| 2019/0186920 A1* | 6/2019 | Leach | G01C 21/30 |
| 2019/0228596 A1* | 7/2019 | Mondello | H04L 12/40 |
| 2020/0094794 A1* | 3/2020 | Calleija | B60T 13/662 |
| 2020/0183008 A1* | 6/2020 | Chen | B60W 10/04 |
| 2020/0191914 A1* | 6/2020 | Kunz | G01S 7/4808 |
| 2020/0201322 A1* | 6/2020 | Somers | G07C 5/04 |
| 2020/0257299 A1* | 8/2020 | Wang | G05D 1/0255 |
| 2020/0272148 A1* | 8/2020 | Karasev | G05D 1/0088 |

* cited by examiner

*Primary Examiner* — Rodney A Butler (74) *Attorney, Agent, or Firm* — Womble Bond Dickinson (US) LLP (57) ABSTRACT

A sensor unit includes a sensor interface, host interface, and pre-processing hardware. The sensor interface is coupled to a plurality of cameras configured to capture images around an autonomous driving vehicle (ADV). The host interface is coupled to a perception and planning system. The pre-processing hardware is coupled to the sensor interface to receive images from the plurality of cameras and to perform one or more pre-processing functions on the images and to transmit pre-processed images to the perception and planning system via the host interface. The perception and planning system is configured to perceive a driving environment surrounding the ADV based on the pre-processed images and to plan a path to control the ADV to navigate through the driving environment. The pre-processing functions can adjust for different calibrations and formats across the plurality of cameras.

21 Claims, 11 Drawing Sheets

FLEXIBLE HARDWARE DESIGN FOR CAMERA CALIBRATION AND IMAGE PRE-PROCESING IN AUTONOMOUS DRIVING VEHICLES

FIELD

Embodiments of the invention relate generally to data and image processing. More particularly, embodiments of the invention relate to flexible hardware design for camera calibration and image-preprocessing for vehicles including autonomous driving vehicles.

BACKGROUND

Vehicles such as an autonomous driving (AD) vehicle is a vehicle that is capable of sensing its environment and moving with little or no driver input. An AD vehicle can sense its environment using any number of sensors such as, e.g., cameras to identify objects, obstacles and appropriate driving paths surrounding the AD vehicle. An AD vehicle can have multiple cameras and each camera may be calibrated differently with different pixel sizes and resolutions capable of producing thirty or more frames of images per second that are sent to a computer in the AD vehicle. Because of the different calibrations and formats of the cameras, one or more processors within the AD computer is required to convert each image from the cameras to proper formats and sizes and perform necessary corrections on each image before the images can be processed for AD driving.

Such processing by processors in the AD computer consumes a substantial amount of processing power and computation resources, especially if the number of cameras and images generated per second is large with varying data types, formats and sizes. That is, the processors in the AD vehicle computer needs to have enough computation capabilities to process the images received from the cameras per second otherwise details in the images or may be missed or images dropped that could be detrimental or devastating for AD driving and, in particular, at fast driving speeds where details in the images are critical to drive the AD vehicle.

BRIEF DESCRIPTION OF THE DRAWINGS

The appended drawings illustrate examples and embodiments and are, therefore, exemplary and not considered to be limiting in scope.

DETAILED DESCRIPTION

The following detailed description provides embodiments and examples of flexible hardware designs for camera calibration and image pre-processing in vehicles including autonomous driving (ADV) vehicles. For one example, sensor unit includes a sensor interface, host interface, and pre-processing hardware. The sensor interface is coupled to a plurality of cameras configured to capture images around an autonomous driving vehicle ADV. The host interface is coupled to a perception and planning system. The pre-processing hardware is coupled to the sensor interface to receive images from the plurality of cameras and to perform one or more pre-processing functions on the images and to transmit pre-processed images to the perception and planning system via the host interface. The perception and planning system is configured to perceive a driving environment surrounding the ADV based on the pre-processed images and to plan a path to control the ADV to navigate through the driving environment. The pre-processing functions can adjust for different calibrations and formats across the plurality of cameras.

For one example, a data processing system for an ADV includes a plurality of cameras and pre-processing hardware. The plurality of cameras captures images around a vehicle. The pre-processing hardware is coupled to the plurality of cameras and performs one or more pre-processing functions on the captured images and outputs pre-processed images to a central processing unit (CPU) or graphics processing unit (GPU), wherein the CPU, GPU and cameras do not perform pre-processing functions. The vehicle can be an AD vehicle or a semi-autonomous driving vehicle.

For one example, the pre-processing hardware can be a field programmable gate array (FPGA), programmable logic array (PLA), application specific integrated circuit (ASIC) or hard-wired circuitry to perform the one or more pre-processing functions on the captured images before they can be processed for assisting in driving a vehicle. By being programmable, pre-processing hardware is flexible to adjust captured images for different applications and for different calibrations, formats, sizes of images from the cameras. For example, such pre-processing hardware can be designed, programmed, adjusted or configured to perform specific pre-processing functions such as, e.g., region of interest (ROI) image processing, image format conversion, image correction, and image high dynamic range (HDR) processing that can adjust for different calibrations and formats across the cameras. In this way, pre-processing functions can be offloaded from being performed by the CPU, GPU and cameras. Moreover, by offloading pre-processing functions from the CPU, GPU and cameras, the CPU, GPU and cameras use less computation power and devote more computation resources to processing the captured images for ADV vehicles.

Reference in the detailed description to "one embodiment" or "one example" means that a particular feature, structure, or characteristic described in conjunction with the embodiment or example can be included in at least one embodiment or example of the disclosure. The appearances of the phrase "in one embodiment" or "in one example" in various places in the detailed description do not necessarily refer to the same embodiment or example. Although the following embodiments or examples refer to data processing in an autonomous driving (AD) vehicle, the embodiments and examples can be implemented for semi-autonomous or non-autonomous vehicles having cameras capturing images for processing.

As set forth herein, various embodiments, examples and aspects will be described with reference to details discussed below, and the accompanying drawings will illustrate various embodiments and examples. The following description and drawings are illustrative and are not to be considered as limiting. Numerous specific details are described to provide a thorough understanding of various embodiments and examples. However, in certain instances, well-known or conventional details are not described to facilitate a concise discussion of the embodiments and examples.

Figure 1:
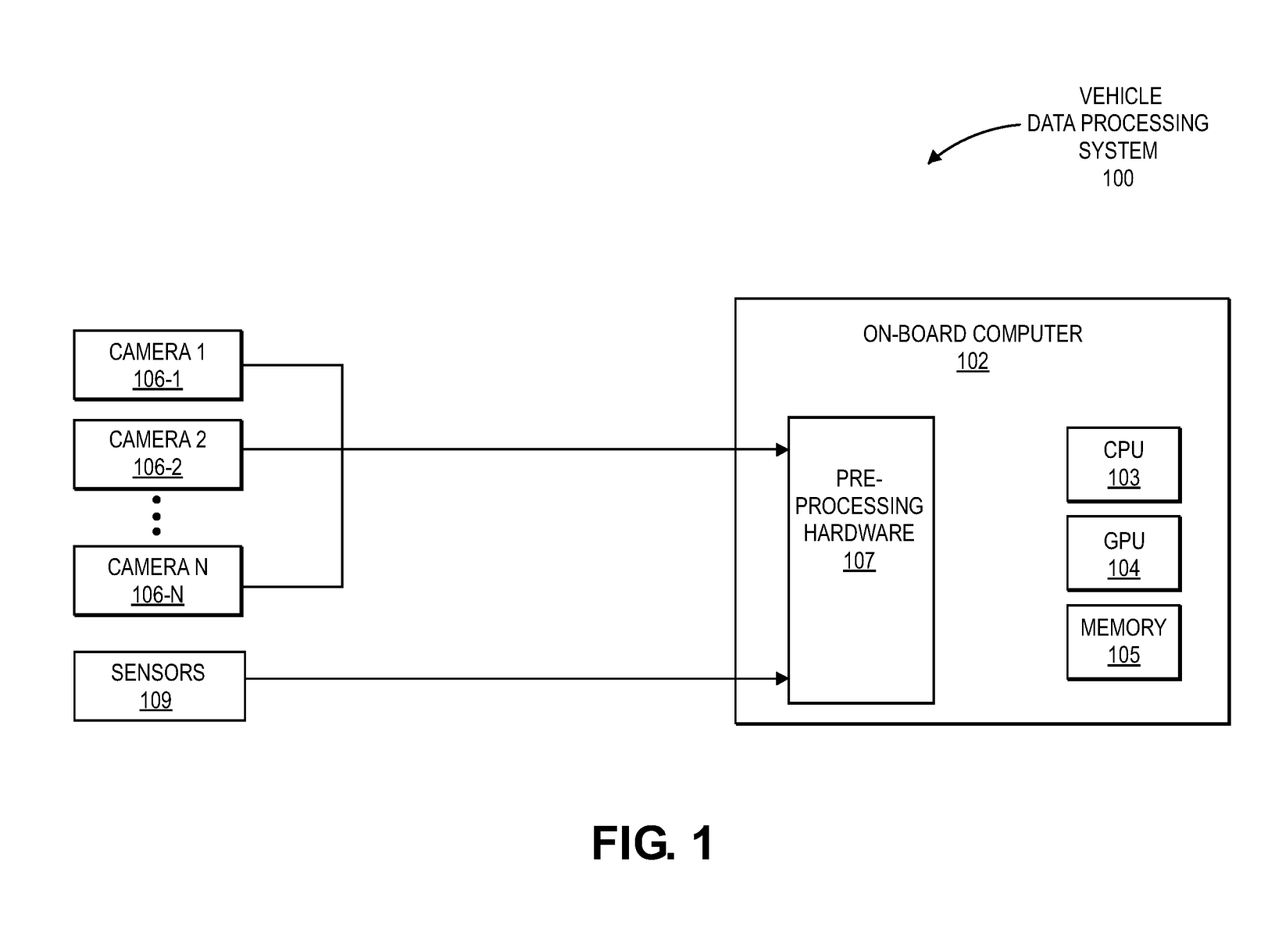
FIG. 1 illustrates an exemplary vehicle data processing system with pre-processing hardware according to one embodiment.

FIG. 1 illustrates one example of a vehicle data processing system 100 with pre-processing hardware 107. For one example, vehicle data processing system 100 includes a plurality of cameras 1-N (106-1 to 106-N) and sensors 109, on-board computer 102 having pre-processing hardware 107, a central processing unit (CPU) 103, graphics processing unit (GPU) 104 and memory 105. Although one CPU 103, GPU 104 and memory 105 are shown, on-board computer 102 can have multiple CPUs, GPUs and memories. On-board computer 102 can be a computer for any type of vehicle including autonomous driving (ADV) vehicles, semi-autonomous vehicles, or non-autonomous vehicles. The cameras 1-N (106-1 to 106-N) and sensors 109 can be coupled to on-board computer 102 by way of a cable or wire or by a network such as a controller area network (CAN), local interconnect network (LIN), or Ethernet network.

Cameras 1-N (106-1 to 106-N) can be any number and type of camera with different calibrations attached or on a vehicle including stereo cameras, RGB (red, green, blue) cameras, YUV (luminance, chrominance) cameras or other cameras to capture two-dimensional 2D or three-dimensional 3D images using pixel sensors around, surrounding, in front of, behind, to the right or left of a vehicle. A vehicle should have enough cameras such that spots or areas around the vehicle are not missed. Each camera 1-N can output any number of frames per second, with varying pixel array dimensions and sizes etc. Sensors 109 can be any type or numbers of sensors on or attached to a vehicle including light detection and ranging devices (LIDARs), ultrasonic devices, radar devices, inertia measurement unit (IMUs), and/or global positioning devices (GPS) for a vehicle. Cameras 1-N (106-1 to 106-N) and sensors 109 are used by on-board computer 102 to identify appropriate navigation paths including obstacles and objects around the vehicle.

Pre-processing hardware 107 can receive images and sensor data from cameras 1-N (106-1 to 106-N) and sensors 109. For one example, pre-processing hardware 107 includes a FPGA, PLA, ASIC or hard-wired circuitry configured to perform specific pre-processing functions, which are not required to be performed by CPU 103, GPU 104 and cameras 1-N. The pre-processing hardware 107 can perform specific pre-processing functions as disclosed FIGS. 2, 3A-3D and 5 that can adjust for different calibrations and formats across cameras 1-N. Example pre-processing functions include region of interest (ROI) image processing, image format conversion, image correction, image high dynamic range (HDR) processing, or other pre-processing functions that can be offloaded from being performed by cameras 1-7 or CPU 103 or GPU 104. After pre-processing, pre-processing hardware 107 can generate pre-processed images that are stored in memory 105. CPU or GPU 104 can implement machine learning models or neural networks to classify images stored in memory 105 from pre-processing hardware 107. Memory 105 can be any type of memory such as a static dynamic random-access memory (SDRAM) or other type of random-access memory.

Figure 2:
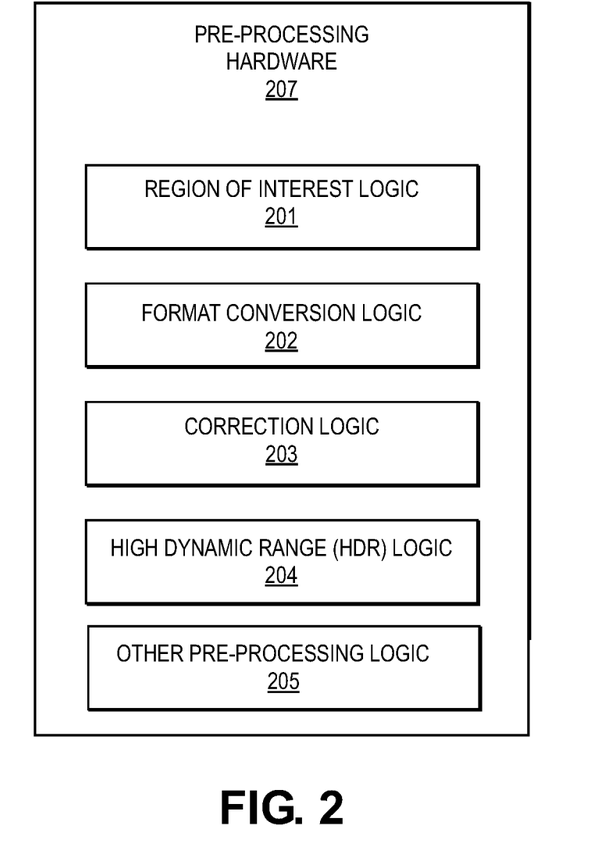
FIG. 2 illustrates a block diagram of pre-processing hardware according to one embodiment.

FIG. 2 illustrates a block diagram of pre-processing hardware 207. Pre-processing hardware 207 includes hardware for region of interest logic 201, format conversion logic 202, correction logic 203, high dynamic range (HDR) logic 204 and other pre-processing logic 205. For one example, referring to FIG. 3A, the region of interest (ROI) logic 201 within pre-processing hardware 207 can receive serialized image data of an image 300 captured from one of the cameras 1-N (106-1 to 106-N) and discard pixel areas of the image 300 which are not needed for processing, e.g., areas near the edges of image 300. The region of interest (ROI) 302 can be identified by specific rows (height) and columns (width) of pixels in the serialized data from cameras 1-N. For example, ROI logic 201 can determine if serialized image data contains pixels in the rows and columns of a designed ROI 302. If not, those pixels are dropped, and if in the ROI 302, the pixels are saved as part of a result image or pre-processed image output from the pre-processing hardware 307.

Figure 3A:
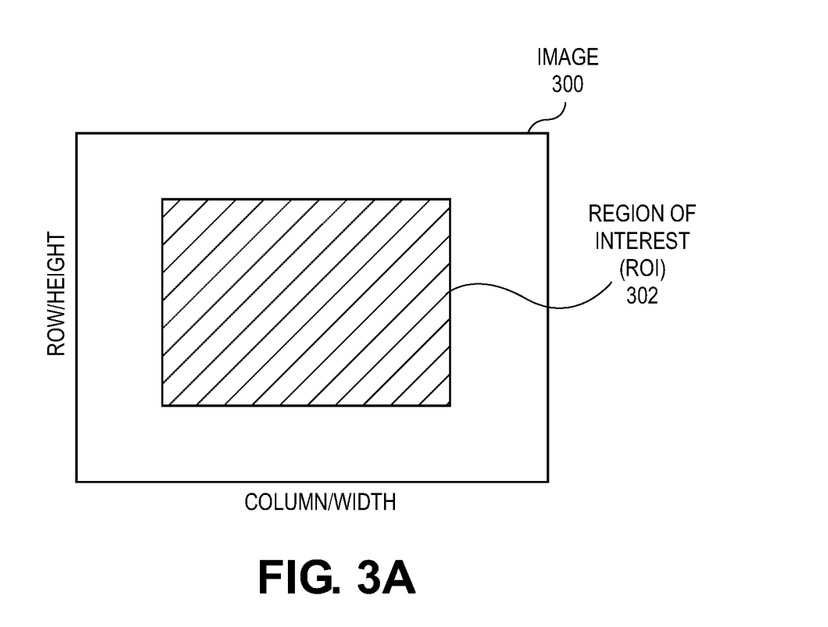
FIGS. 3A-3D illustrate exemplary pre-processing image operations.
Figure 3B:
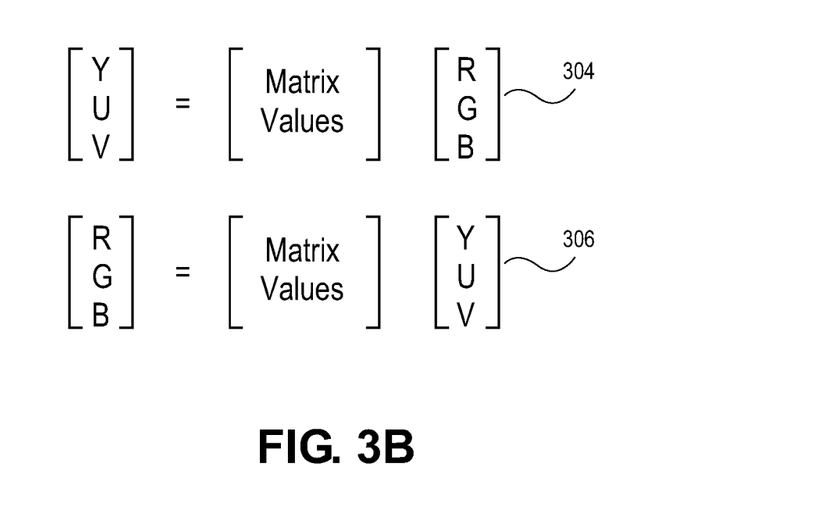

For one example, referring to FIG. 3B, format conversion logic 202, can receive serialized image data of image 300 or ROI 302 derived from ROI logic 201. For one example, image 300 is in a YUV (luminance, chrominance) 304 that needs to be converted to RGB (Red, Green, Blue) format 306. Format conversion logic 202 can use known matrix values and perform a matrix multiplication on pixel data in image 300 to convert YUV data to RGB data or vice versa depending on which format image 300 is captured in. Other types of format conversions can be computed using any number of matrix values and multiplications. The converted pixels can be part of a result image or pre-processed image output from pre-processing hardware 207.

Figure 3C:
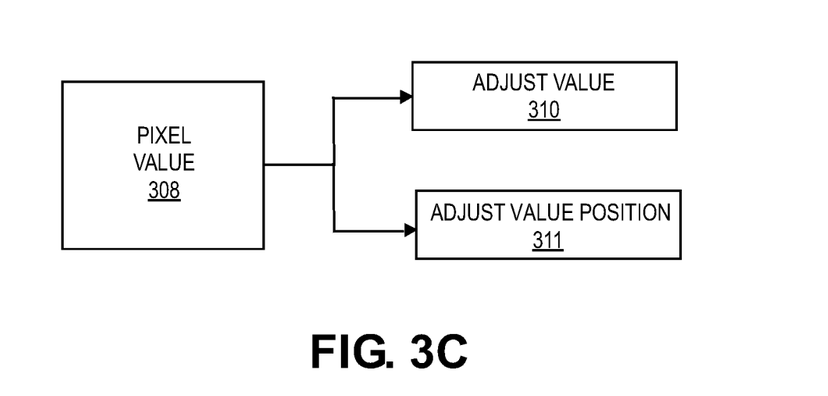

For one example, referring to FIG. 3C, correction logic 203, can receive serialized image data of image 300 or ROI 302 image data or converted data from ROI logic 201 and conversion logic 202. For some images, the image may be distorted or out of focus in certain areas of image 300. Correction logic 203 can identify pixels needing correction, e.g., having a value significantly different from neighboring pixels, which can be adjusted to provide an adjust value 310 or the position of the pixel adjusted in image 300 to provide an adjust value position. The corrected pixels can be part of a result image or pre-processed image output from pre-processing hardware 207.

Figure 3D:
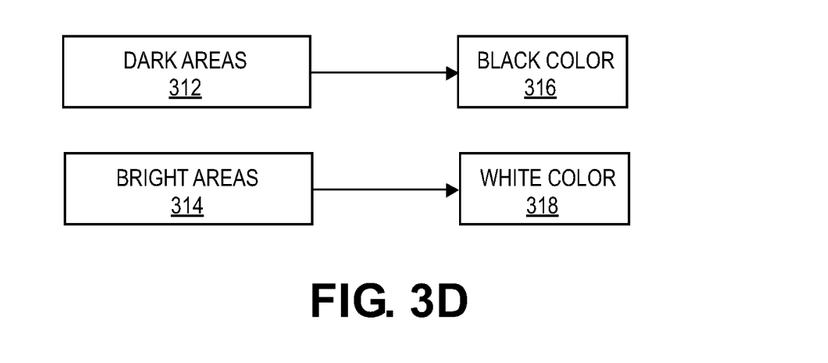

For one example, referring to FIG. 3D, HDR logic 204 can improve the quality of image 300 by providing high dynamic range (HDR) function. HDR can receive serialized image data for image 300 from cameras 1-N or ROI 302 or converted or corrected images from conversion logic 202 or correction logic 203 and perform HDR. For example, HDR logic 204 can determine if pixels are in dark areas 313 and if so change those pixels to a black color 316. HDR logic 204 can also determine if pixels are in bright areas 314 and if so change those pixels to a white color 318. This process of changing dark areas to black and bright areas to white provides high dynamic range for image 300.

The above examples are not limiting and other pre-processing logic 205 can perform any number of functions to be offloaded from cameras 1-N, CPU 103 and GPU 104. Other pre-processing functions can be gathering statistics regarding pre-processing of image data or pre-processing sensor data.

Figure 4:
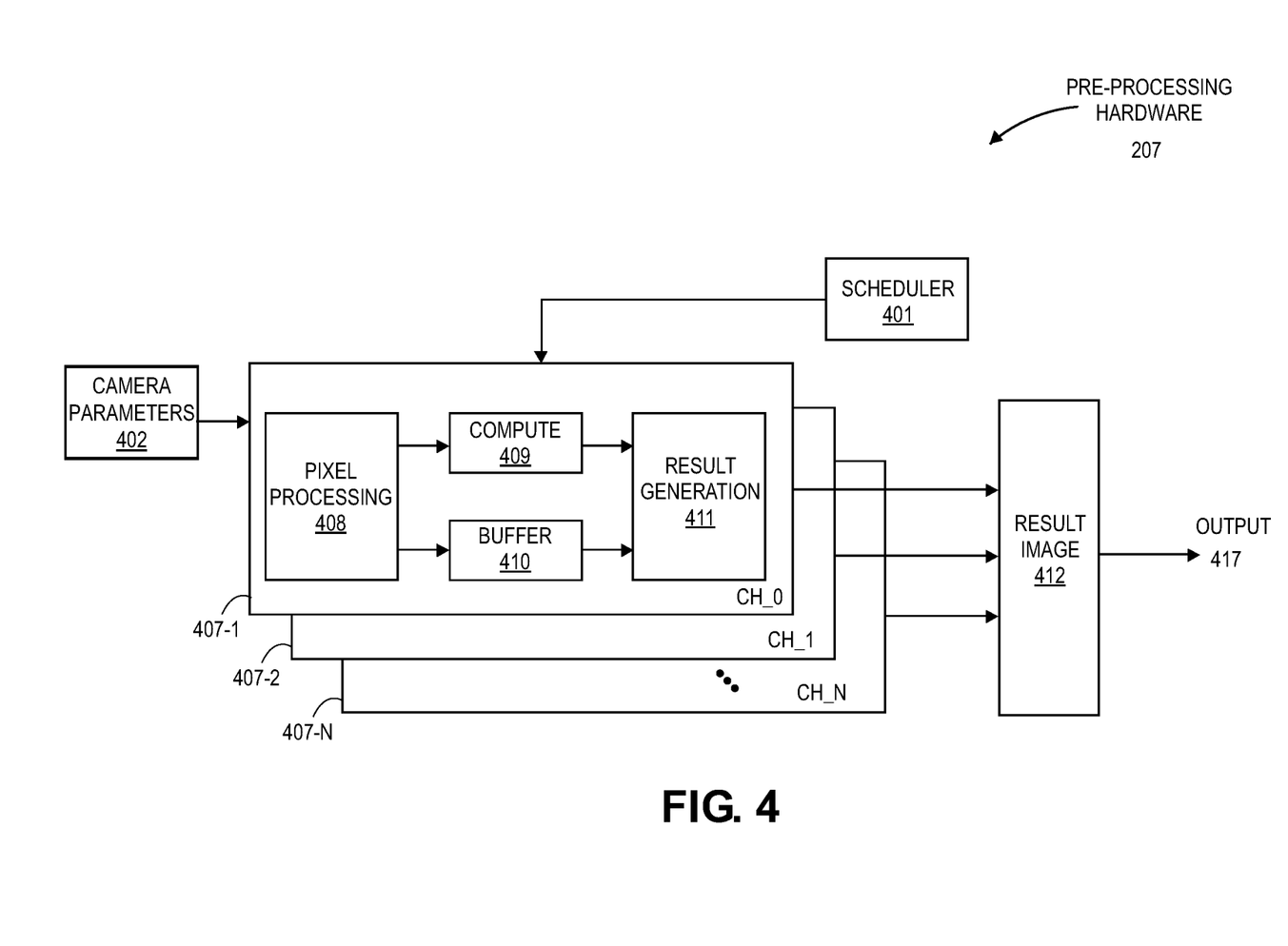
FIG. 4 illustrates pre-processing hardware for processing image data for multiple channels according to one embodiment.

FIG. 4 illustrates one example pre-processing hardware 207 for processing image data for multiple channels 1-N. For one example, if image 300 is in a RGB format, R pixels, G pixels and B pixels can be separate channels. Likewise, if image 300 is in YUV format, Y, U and V pixels can be separate channels. In other examples, sets of images from cameras 1-N can be designated as separate channels.

Referring to FIG. 4, pre-processing hardware 207 can have hardware for each channel CH_0-CH_N (407-1 to 407-N) receiving camera parameters 402 and where a scheduler 401 can control which hardware performs pre-processing functions to generate a result image 412 that is output 417 as a pre-processed image. Camera parameters 402 can include different camera calibration parameters used as inputs to pre-processing hardware 207 and logic such as logic blocks 201-205 described in FIG. 2 including ROI processing, format conversion, image correction, HDR processing and other image pre-processing functions. Referring to hardware 407-1 of channel CH_0, a pixel processing block 408 can receive pixel data from cameras 1-N (106-1 to 106-N). For one example, CH_0 can refer to an R channel or Y channel of an image 300. Pixel processing block can store pixel data in buffer 410 and forward pixel data to compute block 409. Compute 409 can include ROI logic 201, format conversion logic 202, correction logic 203, HDR logic 204 other processing logic 205 and can perform respective computations as described in FIGS. 2 and 3A-3D. The computations from compute block 409 are forward to result generation block 411. Result generation block 411 can produce a result image 412 or pre-processed image that can have a ROI 302 with format conversion, correction and HDR to provide pre-processed images.

For one example, scheduler 401 can have the next channel CH_1 (407-2) perform pre-processing functions in the same manner as channel CH_0 (407-1) having the same hardware and components such as pixel processing block 408, compute block 409, buffer 410 and result generation block 411. For other examples, schedule 401 can control all the channels CH_0 to CH_N (407-1 to 407-2) to perform pre-processing functions in parallel and generate multiple result images 412 as pre-processed images. Result image 412 can be stored in memory 105 of on-board computer 102. CPU 103 or GPU 104 can process the result image 412 without having to do any pre-processing functions to free up computation resources on performing such functions. In this way, CPU 103 and GPU 104 can expend computation resources on processing result image 412 to classify the images using machine learning models or neural networks to assist in navigating a vehicle for AD driving or semi-AD driving.

Figure 5:
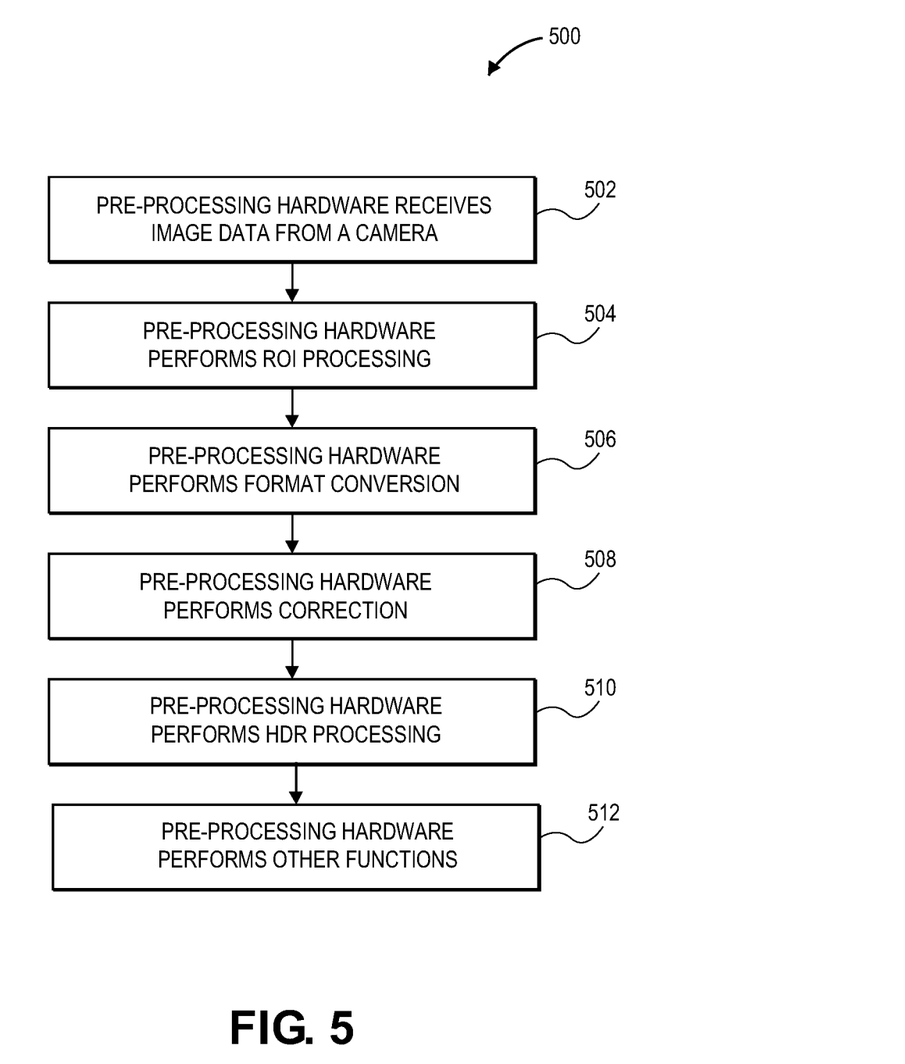
FIG. 5 illustrates a flow diagram of an operation by pre-processing hardware according to one embodiment.

FIG. 5 illustrates one example of a flow diagram of an operation 500 by pre-processing hardware 507. Operation 500 includes blocks 502 to 512. At operation 502, pre-processing hardware receive image data from a camera. For example, pre-processing hardware 207 can receive image data from cameras 1-N (106-1 to 106-N).

At operation 504, pre-processing hardware performs ROI processing on received image data. For example, pre-processing hardware 207 can perform ROI processing as described in FIG. 3A.

At operation 506, pre-processing hardware performs format conversion on received image data. For example, pre-processing hardware 207 can perform format conversion as described in FIG. 3B.

At operation 508, pre-processing hardware performs correction on received image data. For example, pre-processing hardware 207 can perform correction as described in FIG. 3C.

At operation 510, pre-processing hardware performs HDR processing on received image data. For example, pre-processing hardware 207 can perform HDR processing as described in FIG. 3D.

At operation 512, pre-processing hardware performs other functions. Such functions can be any pre-processing functions that can be off loaded from cameras 1-N, CPU 103 and GPU 104. Other pre-processing functions can be gathering statistics regarding pre-processing of image data or pre-processing sensor data from sensors 109. In other examples, operation 500 may perform one or more of the above blocks 502 or 504. For example, if RGB format is a default format, then block 506 may be skipped, or HDR processing is not required, block 510 may be skipped.

According to some embodiments and examples, the techniques described above can be utilized in an autonomous driving system that is designed to autonomously drive an autonomous driving vehicle (ADV). The image processing operations described above can be performed within a sensor unit to process images captured by cameras mounted on an ADV for perceiving a driving environment of an ADV. An ADV refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment.

Figure 6:
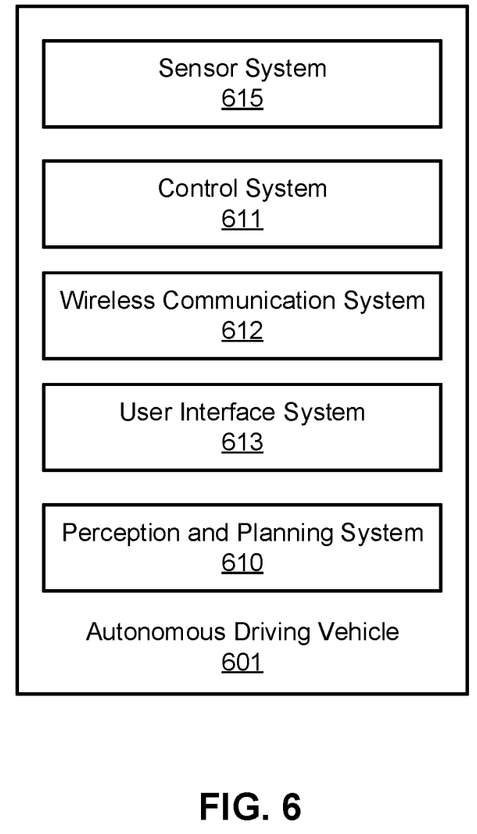
FIG. 6 illustrates an example of an autonomous driving vehicle according to one embodiment.

FIG. 6 is a block diagram illustrating an autonomous vehicle network configuration according to one embodiment. Referring to FIG. 6, autonomous vehicle (ADV) 601 includes, but is not limited to, perception and planning system 610, vehicle control system 611, wireless communication system 612, user interface system 613, infotainment system 114, and sensor system 615. ADV 601 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
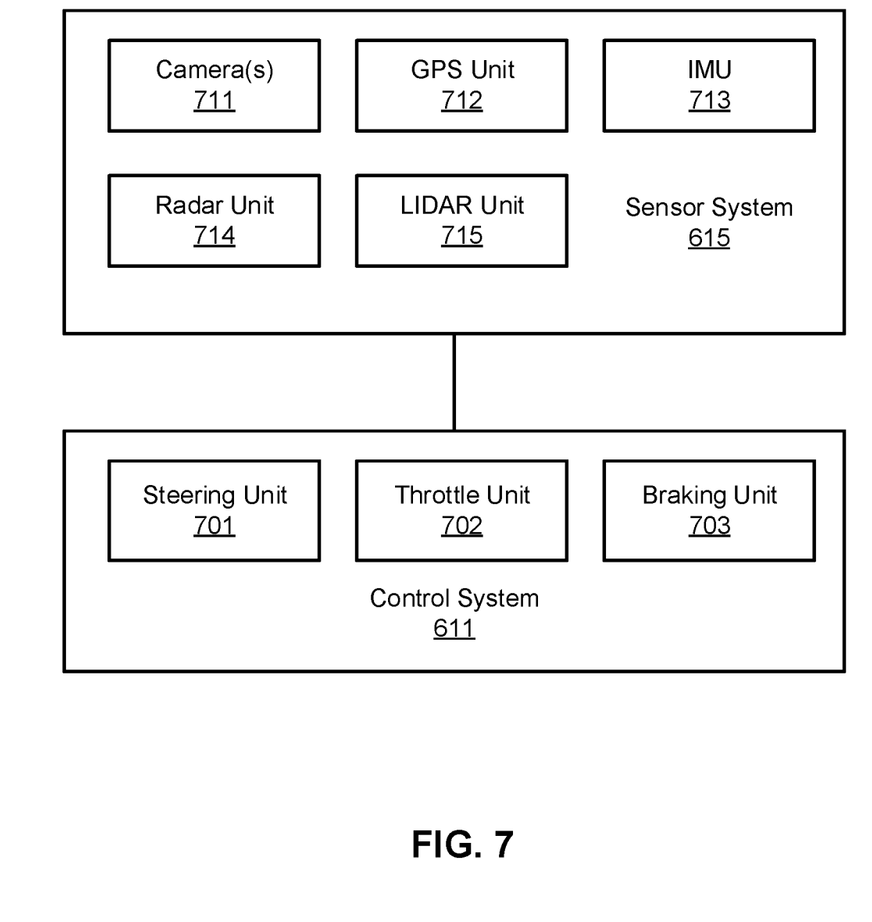
FIG. 7 illustrates an example of a sensor system of an autonomous driving vehicle according to one embodiment.

Referring now to FIG. 7, for one example, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous vehicle. IMU unit 713 may sense position and orientation changes of the autonomous vehicle based on inertial acceleration. Radar unit 714 may represent a system that utilizes radio signals to sense objects within the local environment of the autonomous vehicle. In some embodiments, in addition to sensing objects, radar unit 714 may additionally sense the speed and/or heading of the objects. LIDAR unit 715 may sense objects in the environment in which the autonomous vehicle is located using lasers. LIDAR unit 715 could include one or more laser sources, a laser scanner, and one or more detectors, among other system components. Cameras 711 may include one or more devices to capture images of the environment surrounding the autonomous vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous vehicle 601 is moving along the route, perception and planning system 610 may also obtain real-time traffic information from a traffic information system or server (TIS). Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 8:
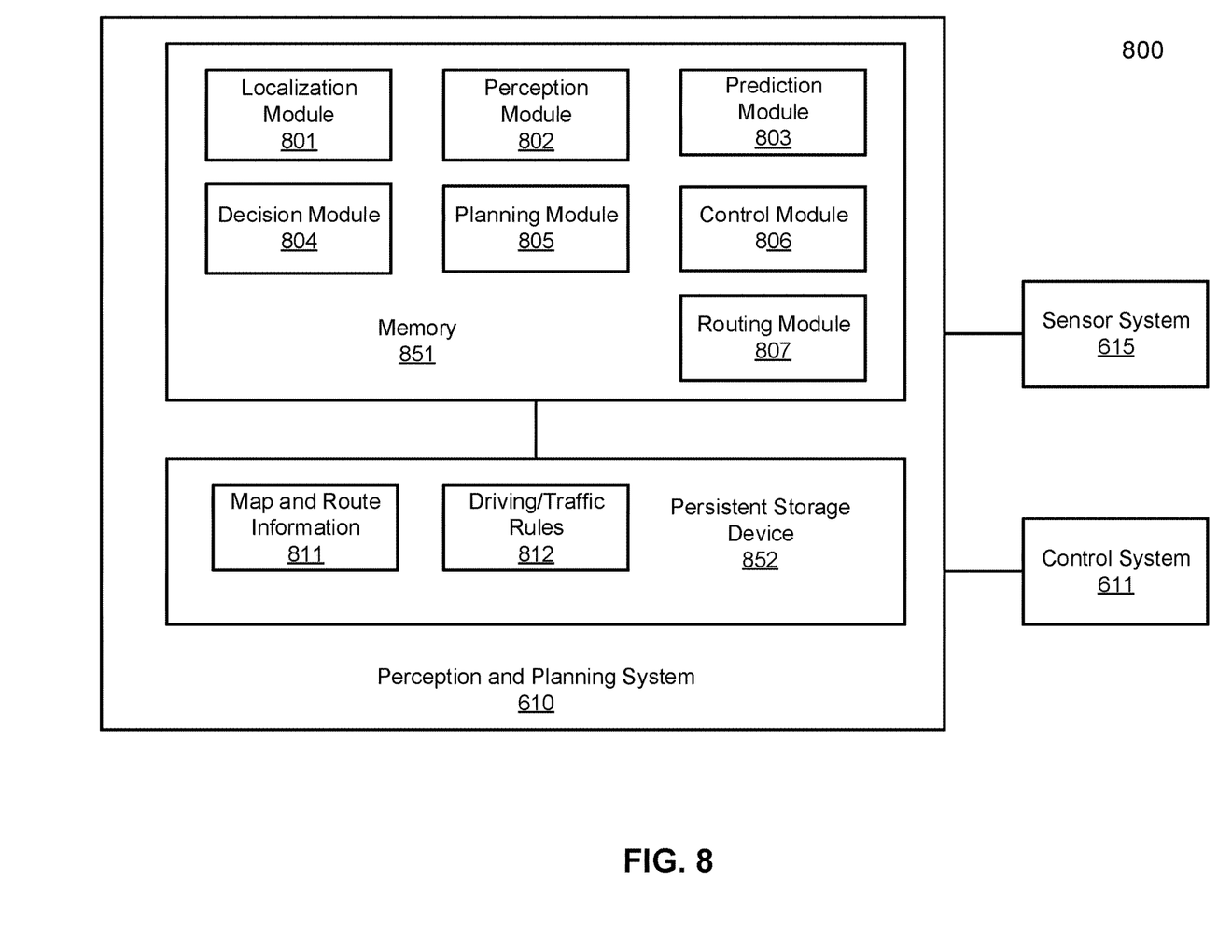
FIG. 8 illustrates an example of an autonomous driving vehicle according to another embodiment.

FIG. 8 is a block diagram illustrating an example of a perception and planning system used with an autonomous vehicle according to one embodiment. System 800 may be implemented as a part of ADV 601 of FIG. 6 including, but is not limited to, perception and planning system 610, control system 611, and sensor system 615. Referring to FIG. 8, perception and planning system 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous vehicle 800 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous vehicle 800, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous vehicle 800 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line.

The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 800 would move in a next moving cycle (e.g., next route/path segment). For example, the planning and control data may instruct vehicle 800 to move 10 meters at a speed of 30 mile per hour (mph), then change to a right lane at the speed of 25 mph.

Based on the planning and control data, control module 806 controls and drives the autonomous vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

For one example, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 613. The navigation system may update the driving path dynamically while the autonomous vehicle is in operation. The navigation system can incorporate data from a GPS system and one or more maps so as to determine the driving path for the autonomous vehicle.

Figure 9A:
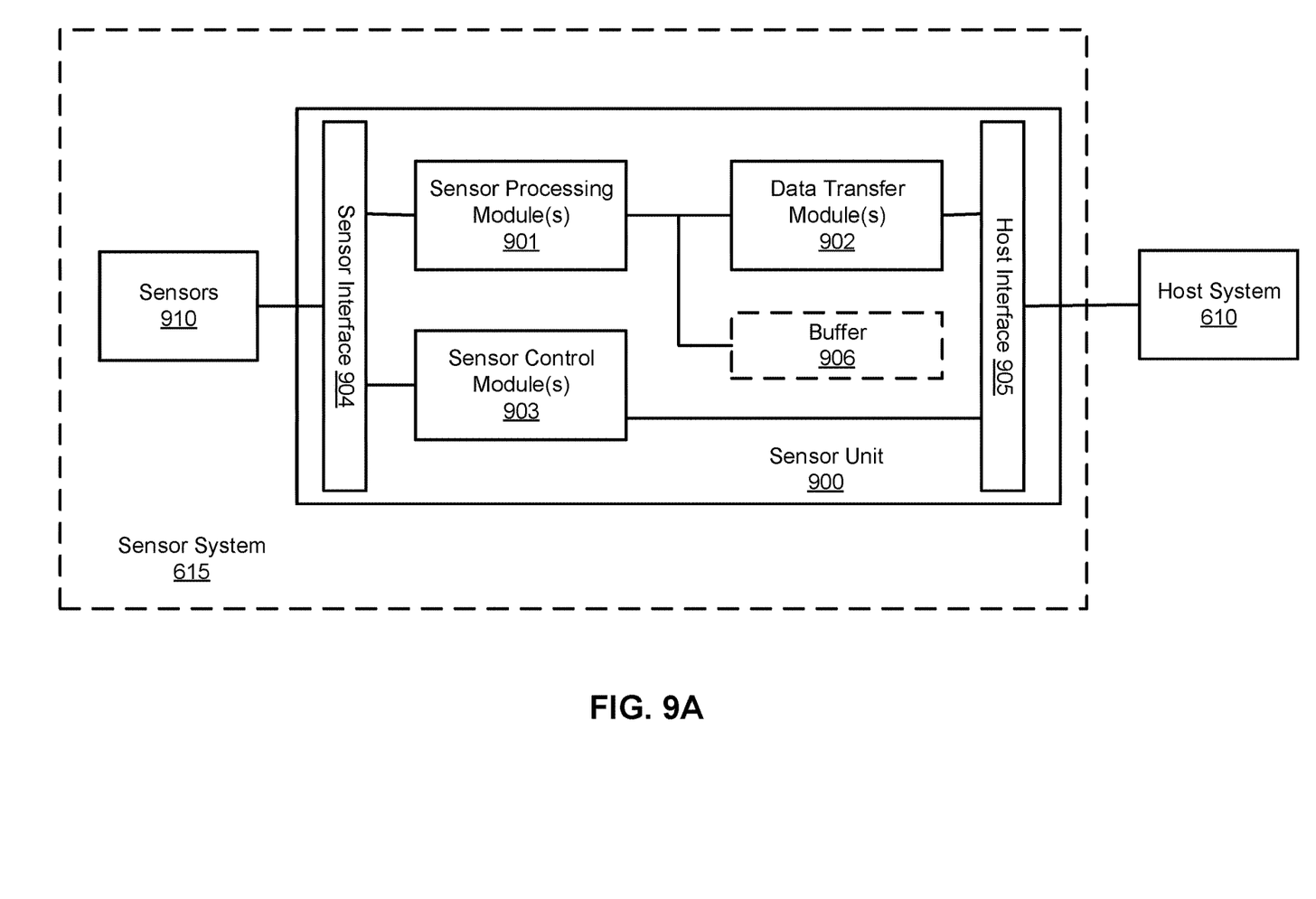
FIGS. 9A and 9B illustrate examples of sensor units according to certain embodiments.

FIG. 9A is a block diagram illustrating an example of a sensor system according to one embodiment of the invention. Referring to FIG. 9A, sensor system 615 includes a number of sensors 910 and a sensor unit 500 coupled to host system 610. Host system 610 represents a planning and control system as described above, which may include at least some of the modules as shown in FIG. 5. Sensor unit 500 may be implemented in a form of an FPGA device or an ASIC (application specific integrated circuit) device. In one embodiment, sensor unit 500 includes, amongst others, one or more sensor data processing modules 901 (also simply referred to as sensor processing modules), data transfer modules 902, and sensor control modules or logic 903. Modules 901-903 can communicate with sensors 910 via a sensor interface 904 and communicate with host system 610 via host interface 905. Optionally, an internal or external buffer 906 may be utilized for buffering the data for processing.

In one embodiment, for the receiving path or upstream direction, sensor processing module 901 is configured to receive sensor data from a sensor via sensor interface 904 and process the sensor data (e.g., format conversion, error checking), which may be temporarily stored in buffer 906. Data transfer module 902 is configured to transfer the processed data to host system 610 using a communication protocol compatible with host interface 905. Similarly, for the transmitting path or downstream direction, data transfer module 902 is configured to receive data or commands from host system 610. The data is then processed by sensor processing module 901 to a format that is compatible with the corresponding sensor. The processed data is then transmitted to the sensor.

For one example, sensor control module or logic 903 is configured to control certain operations of sensors 910, such as, for example, timing of activation of capturing sensor data, in response to commands received from host system (e.g., perception module 802) via host interface 905. Host system 610 can configure sensors 910 to capture sensor data in a collaborative and/or synchronized manner, such that the sensor data can be utilized to perceive a driving environment surrounding the vehicle at any point in time.

Sensor interface 904 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 905 may be any high speed or high bandwidth interface such as PCIe (peripheral component interconnect or PCI express) interface. Sensors 910 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 910 can be any kind of sensors and provided by various vendors or suppliers. Sensor processing module 901 is configured to handle different types of sensors and their respective data formats and communication protocols. According to one embodiment, each of sensors 910 is associated with a specific channel for processing sensor data and transferring the processed sensor data between host system 610 and the corresponding sensor. Each channel includes a specific sensor processing module and a specific data transfer module that have been configured or programmed to handle the corresponding sensor data and protocol, as shown in FIG. 9B.

Figure 9B:
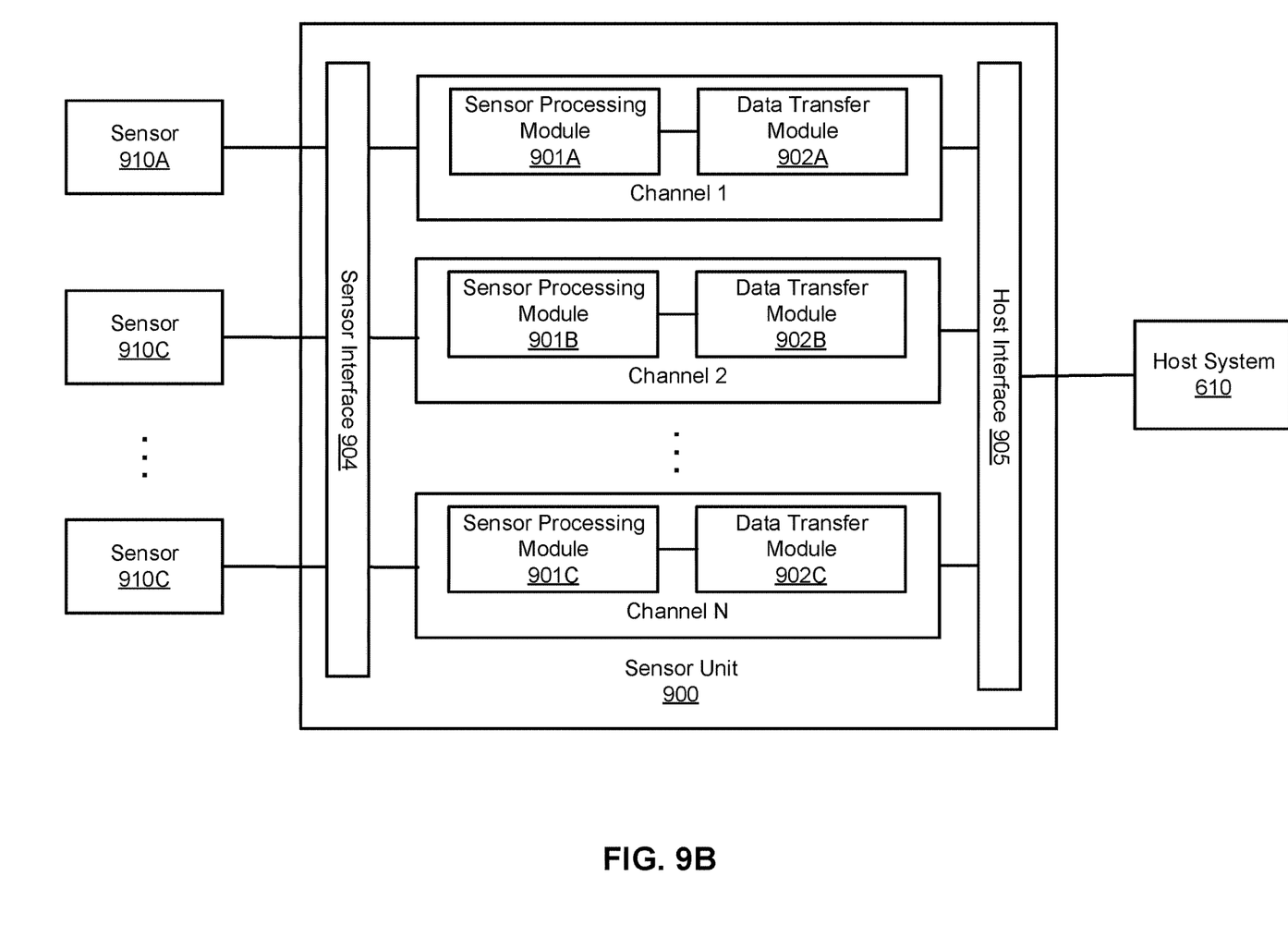

Referring now to FIG. 9B, sensor processing modules 901A-901C are specifically configured to process sensor data obtained from sensors 910A-910C respectively. Note that sensors 910A-910C may the same or different types of sensors. Sensor processing modules 901A-901C can be configured (e.g., software configurable) to handle different sensor processes for different types of sensors. For example, if sensor 910A is a camera, processing module 901A can be figured to handle pixel processing operations on the specific pixel data representing an image captured by camera 910A. Similarly, if sensor 910A is a LIDAR device, processing module 901A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 902A-902C can be configured to operate in different modes, as different kinds of sensor data may be in different size or sensitivities that require different speed or timing requirement. According to one embodiment, each of data transfer modules 902A-902C can be configured to operate in one of a low latency mode, a high bandwidth mode, and a memory mode (also referred to as a fixed memory mode).

When operating in a low latency mode, for one example a data transfer module (e.g., data transfer module 902) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 902) is configured to accumulate the sensor data received from a sensor up to a predetermined amount, but is still within the bandwidth the connection between the data transfer module and the host system 610. The accumulated sensor data is then transferred to the host system 610 in a batch that maximum the bandwidth of the connection between the data transfer module and host system 610. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 610, similar to a shared memory page. Examples of the sensor data to be transferred using memory mode include system status data such as temperature, fans speed, etc.

For one example, pre-processing hardware 207 may be implemented as a part of sensor unit 900 of sensor system 615. For example, pre-processing hardware 207 may be implemented as a part of sensor processing module 901. Sensors 910 may include one or more cameras and sensor processing module 901 is configured to process the images received from cameras 910 as described above.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments or examples of the present disclosure are not described with reference to any particular programming language. It will be appreciated that a variety of programming languages may be used to implement the teachings of embodiments of the disclosure as described herein.

In the foregoing specification, embodiments and examples of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A sensor unit, comprising:
a sensor interface to be coupled to a plurality of cameras configured to capture images around an autonomous driving vehicle (ADV);
a host interface to be coupled to a perception and planning system; and
pre-processing hardware including a field programmable gate array (FPGA), programmable logic array (PLA), application specific integrated circuit (ASIC) or hard-wired circuitry coupled to the sensor interface to receive images from the plurality of cameras and to perform one or more pre-processing functions on the images and to transmit pre-processed images not being processed by a central processing unit (CPU) or graphics processing unit (GPU) to the perception and planning system via the host interface, wherein the perception and planning system is configured to perceive a driving environment surrounding the ADV based on the pre-processed images and to plan a path to control the ADV to navigate through the driving environment.

2. The sensor unit of claim 1, wherein the pre-processing functions adjusts for different calibrations and formats across the plurality of cameras.

3. The sensor unit of claim 1, wherein the pre-processing hardware performs the one or more pre-processing functions not being performed by the plurality of cameras.

4. The sensor unit of claim 3, wherein the one or more pre-processing functions includes region of interest (ROI) image processing, image format conversion, image correction, or image high dynamic range (HDR) processing.

5. The sensor unit of claim 4, wherein the HDR pre-processing function is not performed by the plurality of cameras.

6. The sensor unit of claim 1, wherein the pre-processing hardware includes hardware for a plurality of channels to perform one or more pre-processing functions on captured images for each channel.

7. The sensor unit of claim 6, wherein the pre-processing hardware includes a scheduler to schedule performing pre-processing functions across the plurality of channels.

8. A computer-implemented method for pre-processing images for autonomous driving, the method comprising:
receiving, at a sensor unit via a sensor interface, a plurality of images from a plurality of cameras around an autonomous driving vehicle (ADV);
performing one or more pre-processing functions on the images by pre-processing hardware including a field programmable gate array (FPGA), programmable logic array (PLA), application specific integrated circuit (ASIC) or hard-wired circuitry; and
transmitting pre-processed images not being processed by a central processing unit (CPU) or graphics processing unit (GPU) to a perception and planning system via a host interface, wherein the perception and planning system is configured to perceive a driving environment surrounding the ADV based on at least the pre-processed images and to plan a path to control the ADV to navigate through the driving environment.

9. The method of claim 8, wherein the pre-processing functions adjusts for different calibrations and formats across the plurality of cameras.

10. The method of claim 8, wherein the pre-processing hardware performs the one or more pre-processing functions not being performed by the plurality of cameras.

11. The method of claim 10, wherein the one or more pre-processing functions includes region of interest (ROI) image processing, image format conversion, image correction, or image high dynamic range (HDR) processing.

12. The method of claim 11, wherein the HDR pre-processing function is not performed by the plurality of cameras.

13. The method of claim 8, wherein the pre-processing hardware includes hardware for a plurality of channels to perform one or more pre-processing functions on captured images for each channel.

14. The method of claim 13, wherein the pre-processing hardware includes a scheduler to schedule performing pre-processing functions across the plurality of channels.

15. An autonomous driving system, comprising:
a plurality of sensors, the sensors including one or more cameras to capture images around an autonomous driving vehicle (ADV);
a perception and planning system; and
a sensor unit, wherein the sensor unit includes
a sensor interface coupled to the sensors,
a host interface coupled to the perception and planning system, and
pre-processing hardware including a field programmable gate array (FPGA), programmable logic array (PLA), application specific integrated circuit (ASIC) or hard-wired circuitry coupled to the sensor interface to receive images from the cameras, to perform one or more pre-processing functions on the images, and to transmit pre-processed images not being processed by a central processing unit (CPU) or graphics processing unit (GPU) to the perception and planning system via the host interface, wherein the perception and planning system is configured to perceive a driving environment surrounding the ADV based on at least the pre-processed images and to plan a path to control the ADV to navigate through the driving environment.

16. The system of claim 15, wherein the pre-processing functions adjusts for different calibrations and formats across the plurality of cameras.

17. The system of claim 15, wherein the pre-processing hardware performs the one or more pre-processing functions not being performed by the plurality of cameras.

18. The system of claim 17, wherein the one or more pre-processing functions includes region of interest (ROI) image processing, image format conversion, image correction, or image high dynamic range (HDR) processing.

19. The system of claim 18, wherein the HDR pre-processing function is not performed by the plurality of cameras.

20. The system of claim 15, wherein the pre-processing hardware includes hardware for a plurality of channels to perform one or more pre-processing functions on captured images for each channel.

21. The system of claim 20, wherein the pre-processing hardware includes a scheduler to schedule performing pre-processing functions across the plurality of channels.

* * * * *